US012397402B2

(12) United States Patent
Yuan

(10) Patent No.: US 12,397,402 B2
(45) Date of Patent: Aug. 26, 2025

(54) STAPLE GUN

(71) Applicant: Yuyao Tangwen Tools Co., Ltd., Zhejiang (CN)

(72) Inventor: Jianming Yuan, Ningbo (CN)

(73) Assignee: Yuyao Tangwen Tools Co., Ltd., Ningbo (CN)

(*) Notice: Subject to any disclaimer, the term of this patent is extended or adjusted under 35 U.S.C. 154(b) by 0 days.

(21) Appl. No.: 18/642,731

(22) Filed: Apr. 22, 2024

(65) Prior Publication Data

US 2024/0269814 A1 Aug. 15, 2024

(30) Foreign Application Priority Data

Apr. 24, 2023 (CN) ......................... 202310465264.3

(51) Int. Cl.
*B25C 5/11* (2006.01)
*B25C 5/16* (2006.01)

(52) U.S. Cl.
CPC .............. *B25C 5/11* (2013.01); *B25C 5/1617* (2013.01)

(58) Field of Classification Search
CPC ................................ B25C 5/11; B25C 5/1617
See application file for complete search history.

(56) References Cited

U.S. PATENT DOCUMENTS 2,268,102 A * 12/1941 Attula ....................... B25C 5/16 227/126
4,025,031 A * 5/1977 Chi ....................... B25C 5/0285 227/132
5,165,587 A * 11/1992 Marks ....................... B25C 5/11 227/132
5,407,118 A * 4/1995 Marks ..................... B25C 5/085 227/132
5,497,932 A * 3/1996 Brewer ..................... B25C 5/11 227/132
5,505,362 A * 4/1996 Marks ................... B25C 5/1606 227/120
5,664,722 A * 9/1997 Marks ..................... B25C 5/085 227/132
6,145,728 A * 11/2000 Marks ....................... B25C 5/11 227/120
6,789,719 B2 * 9/2004 Shor ......................... B25C 5/11 227/120

(Continued)

*Primary Examiner* — Anna K Kinsaul
*Assistant Examiner* — David G Shutty
(74) *Attorney, Agent, or Firm* — Addison D. Ault; IPGentleman Intellectual Property Services, LLC

(57) ABSTRACT

The present disclosure relates to a staple gun. The staple gun includes a staple gun shell with a fixed handle and a movable handle, and provided with a staple storage mechanism with a staple outlet. The staple gun shell is internally and slidably provided with a staple striking assembly through an elastic sliding mechanism. A pry bar type linkage reset mechanism, arranged between the movable handle and the staple striking assembly, is capable of driving one end of the staple striking assembly to get away from the staple outlet when the movable handle moves toward the fixed handle under an external force, or when the external force disappears, the pry bar type linkage reset mechanism is capable of making the movable handle move far away from the fixed handle, and one end of the staple striking assembly slides into the staple outlet under the action of the elastic sliding mechanism.

8 Claims, 9 Drawing Sheets

(56) References Cited

U.S. PATENT DOCUMENTS

| | | | | |
|---|---|---|---|---|
| 7,464,845 | B2 * | 12/2008 | Chou | B25C 5/11 227/127 |
| 8,322,010 | B2 * | 12/2012 | Boswinkel | B25C 5/06 227/151 |
| 9,808,923 | B2 * | 11/2017 | Hu | B25C 5/1606 |
| 11,305,410 | B2 * | 4/2022 | Yeh | B25C 5/11 |
| 11,472,014 | B2 * | 10/2022 | Marks | B25C 5/11 |
| 2011/0297725 | A1 * | 12/2011 | Huang | B25C 5/11 227/140 |
| 2013/0228605 | A1 * | 9/2013 | Wang | B25C 5/11 227/8 |
| 2014/0231486 | A1 * | 8/2014 | Burch | B25C 5/0285 227/63 |
| 2017/0057071 | A1 * | 3/2017 | Pelletier | B25C 5/1696 |
| 2023/0068249 | A1 * | 3/2023 | Yeh | B25C 5/11 |
| 2024/0286259 | A1 * | 8/2024 | Fedrigon | B25C 5/11 |

* cited by examiner

STAPLE GUN

TECHNICAL FIELD

The present disclosure belongs to the technical field of staple gun equipment, and particularly relates to a staple gun.

BACKGROUND

Staple guns are widely used in the decoration industry. Based on different driving sources, staple guns are divided into electric staple guns, pneumatic staple guns, gas-powered staple guns, manual staple guns, etc. The pneumatic staple guns and the electric staple guns use electric power or air compressors as power sources to drive striking pins in air cylinders of the staple guns to do striking motion to drive staples in a staple magazine into objects or shoot staples out. Although operations are easy, a fixed power supply or a set of air compressor equipment is required, which can consume more electric energy and is extremely unsafe and inconvenient because of a long power cord.

In the prior art, a multifunctional nailing gun disclosed in the Chinese patent document with the application number 201020136417.8, comprising a nailing gun shell, a handle body and a grip, a nailing mechanism, an automatic nail feeding device and a driving structure of the nailing mechanism are arranged in the nailing gun shell, the automatic nail feeding device comprises an outer grooved rail and an inner grooved rail in sliding fit within the outer grooved rail, the tail of the inner grooved rail is provided with a through hole, an adjusting pin is arranged in the through hole, the adjusting pin is in clearance fit with the through hole, the nailing gun shell is provided with two adjusting holes that allow two ends of the adjusting pin to extend out of the nailing gun shell, the sectional area of the adjusting hole is greater than that of the adjusting pin, one end of the adjusting pin is provided with an adjusting step, and the sectional area of the adjusting step is slightly smaller than that of the adjusting hole; the nailing gun shell is further internally provided with a spring, one free end of the spring abuts against an inner wall of the tail of the nailing gun shell, and the other free end of the spring abuts against the adjusting pin.

The aforementioned solution solves the problem of the inconvenience brought by existing electric staple guns or pneumatic staple guns to some extent. However, the solution still has the problem that a staple gun is too complex in structure, a staple outlet warps upward easily to affect normal use, and the like.

SUMMARY

To solve the aforementioned problems, the present disclosure provides a staple gun.

To achieve the goal, the present disclosure adopts the following technical solution: a staple gun, comprising a staple gun shell with a fixed handle and a movable handle, the staple gun shell is provided with a staple storage mechanism, one end of the staple storage mechanism is provided with an opening that extends into one end of the staple gun shell to form a staple outlet, the staple gun shell is internally and slidably provided with a staple striking assembly through an elastic sliding mechanism, one end of the staple striking assembly is capable of penetrating into the staple outlet, a pry bar type linkage reset mechanism, arranged between the movable handle and the staple striking assembly, is capable of driving one end of the staple striking assembly to get away from the staple outlet when the movable handle moves toward the fixed handle under an external force, or when the external force disappears, the pry bar type linkage reset mechanism is capable of making the movable handle move far away from the fixed handle, and one end of the staple striking assembly slides into the staple outlet under the action of the elastic sliding mechanism. When the movable handle moves toward the fixed handle under the external force, the pry bar type linkage reset mechanism follows the movable handle to start running. The pry bar type linkage reset mechanism runs to drive the staple striking assembly to move in an elastic sliding mechanism to enable the staple striking assembly to get away from the staple outlet. When the external force disappears, the pry bar type linkage reset mechanism is reset, and the staple striking assembly moves toward the staple outlet through the elastic sliding mechanism and is in contact with the staple storage mechanism at the same time.

In the aforementioned staple gun, the staple striking assembly comprises a staple striking plate slidably arranged in the staple outlet, and one end, far away from the staple outlet, of the staple striking plate is connected to a sliding plate. The staple striking plate with a thickness equal to or less than that of a staple is used for pushing the staple out. One end of the staple striking plate is connected to the sliding plate so that the staple striking plate can be pushed out or tightened by moving the sliding plate. Moreover, the thickness of the sliding plate is more than that of the staple striking plate, thereby being capable of prolonging the service life of the staple striking plate.

In the aforementioned staple gun, the elastic sliding mechanism comprises a sliding groove arranged on one side inside the staple gun shell, the sliding plate is slidably arranged in the sliding groove, one end of the sliding groove is provided with a staple output base, the staple outlet is formed on one side of the staple output base in an axial direction, a bending part extending downward is arranged between the staple striking plate and the sliding plate, a staple striking torsion spring is arranged in the staple gun shell, one end of the staple striking torsion spring acts on the bending part, and the other end of the staple striking torsion spring acts on the staple gun shell or the movable handle. The staple output base has a limiting and protecting effect on the staple striking plate so that the staple striking plate can operate normally without deviation or without causing the staple outlet to get jammed. The bending part of the sliding plate has the effect of pushing the staple striking plate out. The staple striking torsion spring is tightened through the backward movement of the sliding plate. When the sliding plate is released, the staple striking torsion spring returns to drive the bending part of the sliding plate to move forward, thereby generating a push force.

In the aforementioned staple gun, the pry bar type linkage reset mechanism comprises a pry bar linkage assembly and a pry bar reset assembly which are arranged in the staple gun shell.

In the aforementioned staple gun, the pry bar linkage assembly comprises a linkage base movably arranged in the staple gun shell, one end of the linkage base is inserted into a sliding hole at one end, far away from the staple striking plate, of the sliding plate, and a linkage structure, arranged between the linkage base and the movable handle, is capable of making the linkage base move synchronously to enable the sliding plate to move far away from the staple striking plate when the movable handle moves toward the fixed handle under an external force. One end of the linkage base is arranged in the sliding hole of the sliding plate, and the movable handle drives the linkage base to move through the linkage structure, thereby enabling the sliding plate to move backward.

In the aforementioned staple gun, the linkage structure comprises a linkage plate arranged between the linkage base and the movable handle, one end of the linkage plate is connected to the movable handle through a first movable shaft, one end, far away from the sliding hole, of the linkage base is provided with a strip-shaped hole that extends in an axial direction, a fixed shaft pin that is fixedly arranged in the staple gun shell penetrates into one end of the strip-shaped hole, a second movable shaft that is connected to one end, far away from the movable handle, of the linkage plate slidably penetrates into the other end of the strip-shaped hole, the staple gun shell is internally provided with a movable groove, and an end part of the second movable shaft is movably arranged in the movable groove. The linkage plate plays a role of a pry bar and moves between the linkage base and the movable handle through the first movable shaft and the second movable shaft. When the movable handle is under stress, the linkage plate moves toward the linkage base, and the linkage base enables an upper end of the linkage base to move backward through the fixed shaft pin, thereby driving the sliding plate to move.

In the aforementioned staple gun, the pry bar reset assembly comprises a return spring arranged in the staple gun shell, one end of the return spring acts on an outer side of one end, far away from the strip-shaped hole, of the linkage base, and the other end of the return spring acts on an inner side of the staple gun shell. The return spring mainly plays a role in helping the linkage base to return and also has the effect of pushing the sliding plate.

In the aforementioned staple gun, the fixed handle is integrally formed on the staple gun shell, the movable handle has a handle gripping part and a handle connecting part, the handle connecting part is hinged to the interior of the staple gun shell through a hinge shaft, the movable handle is located on one side, close to the staple outlet, of the fixed handle, the hinge shaft is arranged at one end, far away from the handle gripping part, of the handle connecting part, the second movable shaft is arranged between the hinge shaft and the handle gripping part, the linkage base is movably arranged on one side, far away from the staple outlet, of the movable handle and located on an inner side of an upper end of the fixed handle, and the return spring is obliquely arranged; or the movable handle is located on one side, far away from the staple outlet, of the fixed handle, the hinge shaft is arranged at one end, close to the handle gripping part, of the handle connecting part, the second movable shaft is arranged on one side, far away from the handle gripping part, of the hinge shaft, the linkage base is movably arranged on one side, close to the staple outlet, of the movable handle and located on an inner side of an upper end of the fixed handle, and the return spring and the sliding plate extend in the same direction.

In the aforementioned staple gun, the staple storage mechanism comprises a staple storage aluminum section detachably arranged on the staple gun shell through a first connecting bolt, one end of the staple storage aluminum section corresponds to the staple outlet, one side of the staple storage aluminum section is provided with an elastic buffer part that abuts against the bending part, one end, far away from the staple outlet, of the staple storage aluminum section is provided with a staple groove base through a second connecting bolt, the staple groove base is provided with a staple feeding base body that penetrates into the staple storage aluminum section and extends to the staple outlet, and a staple feeding block, which is connected to a tension spring located in the staple feeding base body and corresponds to the staple outlet, is slidably arranged in the staple feeding base body. When the staple striking torsion spring returns to drive the sliding plate to move forward, the bending part of the sliding plate abuts against the elastic buffer part, and the elastic buffer achieves a buffering effect, thereby prolonging the service life of the staple gun.

In the aforementioned staple gun, both the fixed handle and the movable handle are curved, an open space is formed between the fixed handle and the movable handle, and the open space can release a gripping space and improve the applicability. When the movable handle is located on one side, far away from the staple outlet, of the fixed handle, a handle locking block is rotationally arranged on the staple gun shell, and the handle locking block is connected to a stop block that is located in the staple gun shell and is capable of abutting against a notch at one end, far away from the sliding hole, of the linkage base.

Compared with the prior art, the present disclosure has the following advantages:

1. The device adopts an open-type handle structure, and the handle and the staple storage mechanism are separated to release the gripping space.
2. In the device, the movable handle is arranged between the staple storage mechanism and the fixed handle to form a lift-type staple gun, thereby solving the problem that a staple outlet warps upward during the use of an existing staple gun.
3. In the device, the movable handle is arranged on one side, far away from the staple storage mechanism, of the fixed handle, a pressing type staple gun is formed, and an internal structure is reduced to be compact so that an acting force of the handle faces toward the staple outlet, thereby preventing the staple outlet from warping upward.

DETAILED DESCRIPTION OF EMBODIMENTS

Figure 1:
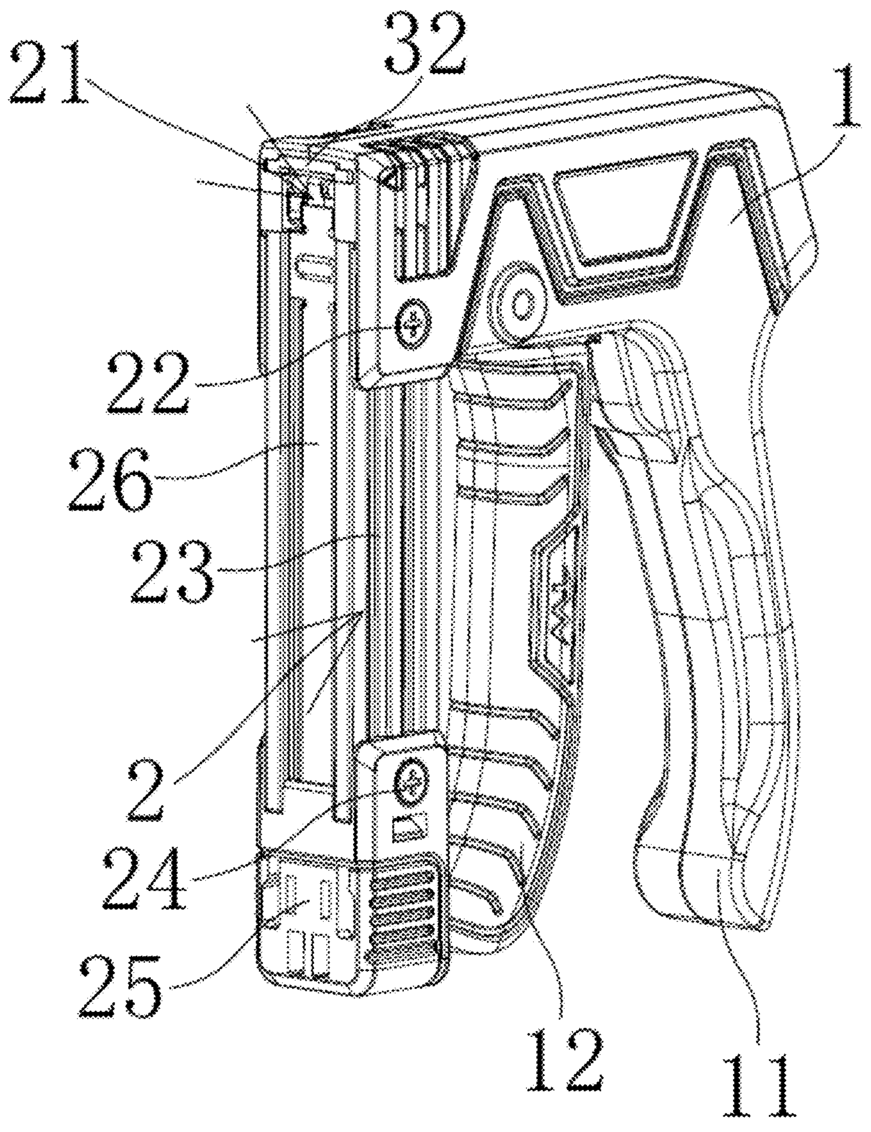
FIG. 1 is a structural schematic view of embodiment 1 according to the present disclosure.

The present disclosure will be further described in detail in combination with the accompanying drawings and the specific embodiments.

Embodiment 1

As shown in FIGS. 1 to 5, a staple gun includes a staple gun shell 1 with a fixed handle 11 and a movable handle 12, wherein the staple gun shell 1 is provided with a staple storage mechanism 2, one end of the staple storage mechanism 2 is provided with an opening which extends into one end of the staple gun shell 1 to form a staple outlet 21, the staple gun shell 1 is internally and slidably provided with a staple striking assembly 4 through an elastic sliding mechanism 3, and one end of the staple striking assembly 4 is capable of penetrating into the staple outlet 21, a pry bar type linkage reset mechanism 5, arranged between the movable handle 12 and the staple striking assembly 4, is capable of driving one end of the staple striking assembly 4 to get away from the staple outlet 21 when the movable handle 12 moves toward the fixed handle 11 under an external force, or when the external force disappears, the pry bar type linkage reset mechanism 5 is capable of driving the movable handle 12 to move far away from the fixed handle 11, and one end of the staple striking assembly 4 slides into the staple outlet 21 under the action of the elastic sliding mechanism 3. When the movable handle 12 moves toward the fixed handle 11 under the external force, the pry bar type linkage reset mechanism 5 follows the movable handle 12 to start running. The pry bar type linkage reset mechanism 5 runs to drive the staple striking assembly 4 to move in an elastic sliding mechanism 3 to enable the staple striking assembly 4 to get away from the staple outlet 21. When the external force disappears, the pry bar type linkage reset mechanism 5 is reset, and the staple striking assembly 4 moves toward the staple outlet 21 through the elastic sliding mechanism 3 and is in contact with the staple storage mechanism 2 at the same time.

Figure 3:
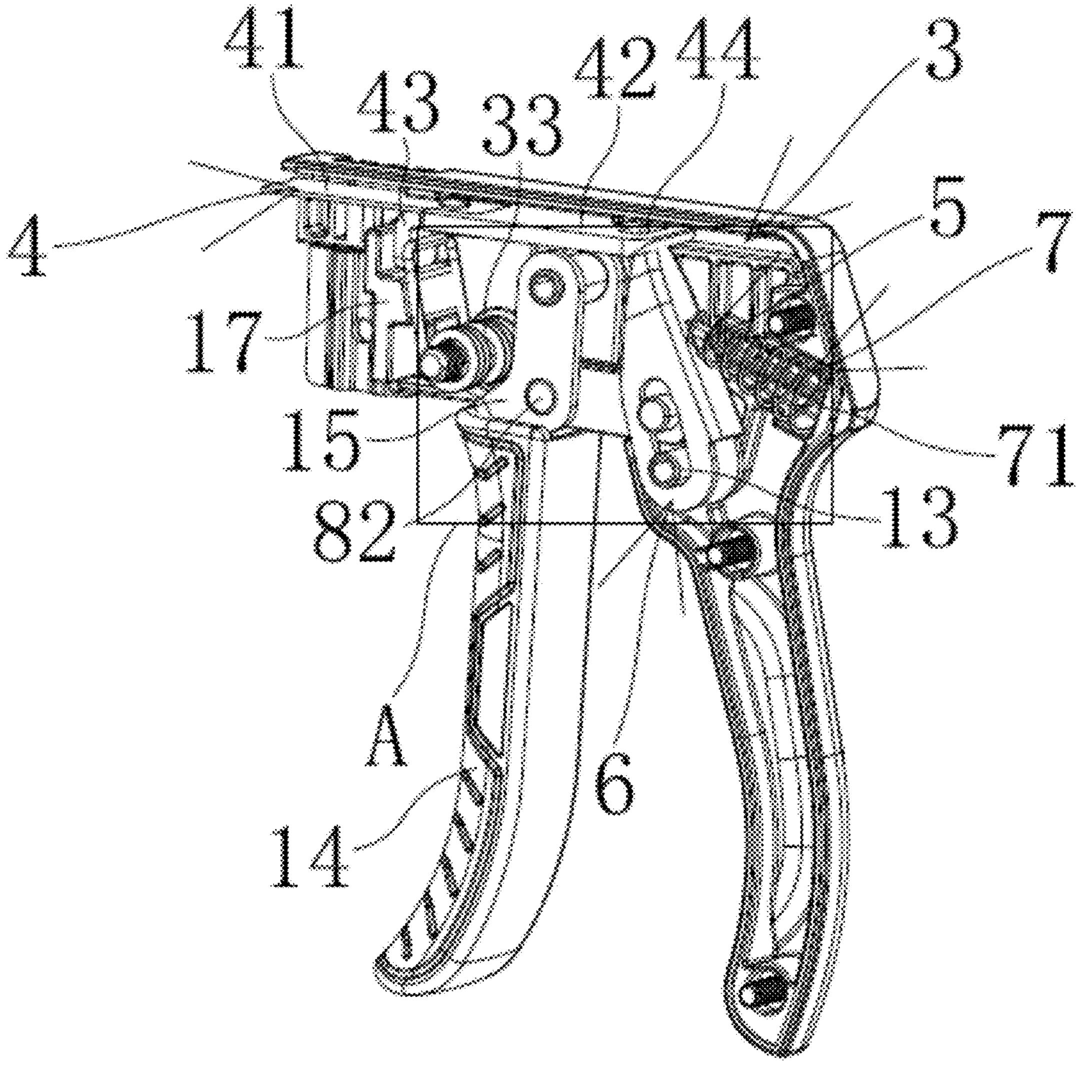
FIG. 3 is a schematic view of an internal structure according to embodiment 1 of the present disclosure.

As shown in FIG. 3, the staple striking assembly 4 includes a staple striking plate 41 slidably arranged in the staple outlet 21, and one end, far away from the staple outlet 21, of the staple striking plate 41 is connected to a sliding plate 42. The staple striking plate 41 with a thickness equal to or less than that of a staple is used for pushing the staple out. One end of the staple striking plate 41 is connected to the sliding plate 42 so that the staple striking plate 41 can be pushed out or tightened by moving the sliding plate 42. Moreover, the thickness of the sliding plate 42 is more than that of the staple striking plate 41, thereby being capable of prolonging the service life of the staple striking plate 41.

The elastic sliding mechanism 3 includes a sliding groove 31 arranged on one side inside the staple gun shell 1, the sliding plate 42 is slidably arranged in the sliding groove 31, one end of the sliding groove 31 is provided with a staple output base 32, the staple outlet 21 is formed on one side of the staple output base 32 in an axial direction, a bending part 43 extending downward is arranged between the staple striking plate 41 and the sliding plate 42, a staple striking torsion spring 33 is arranged in the staple gun shell 1, one end of the staple striking torsion spring 33 acts on the bending part 43, and the other end of the staple striking torsion spring acts on the staple gun shell 1 or the movable handle 12. The staple output base 32 has a limiting and protecting effect on the staple striking plate 41 so that the staple striking plate 41 can operate normally without deviation or without causing the staple outlet 21 to get jammed. The bending part 43 of the sliding plate 42 has the effect of pushing the staple striking plate 41 out. The staple striking torsion spring 33 is tightened through the backward movement of the sliding plate 42. When the sliding plate 42 is released, the staple striking torsion spring 33 returns to drive the bending part 43 of the sliding plate 42 to move forward, thereby generating a push force.

Specifically, the pry bar type linkage reset mechanism 5 includes a pry bar linkage assembly 6 and a pry bar reset assembly 7 which are arranged in the staple gun shell 1.

Further, the pry bar linkage assembly 6 includes a linkage base 61 movably arranged in the staple gun shell 1, one end of the linkage base 61 is inserted into a sliding hole 44 at one end, far away from the staple striking plate 41, of the sliding plate 42, and a linkage structure 8, arranged between the linkage base 61 and the movable handle 12, is capable of making the linkage base 61 move synchronously to enable the sliding plate 42 to move far away from the staple striking plate 41 when the movable handle 12 moves toward the fixed handle 11 under an external force. One end of the linkage base 61 is arranged in the sliding hole 44 of the sliding plate 42, and the movable handle 12 drives the linkage base 61 to move through the linkage structure 8, thereby enabling the sliding plate 42 to move backward.

Figure 4:
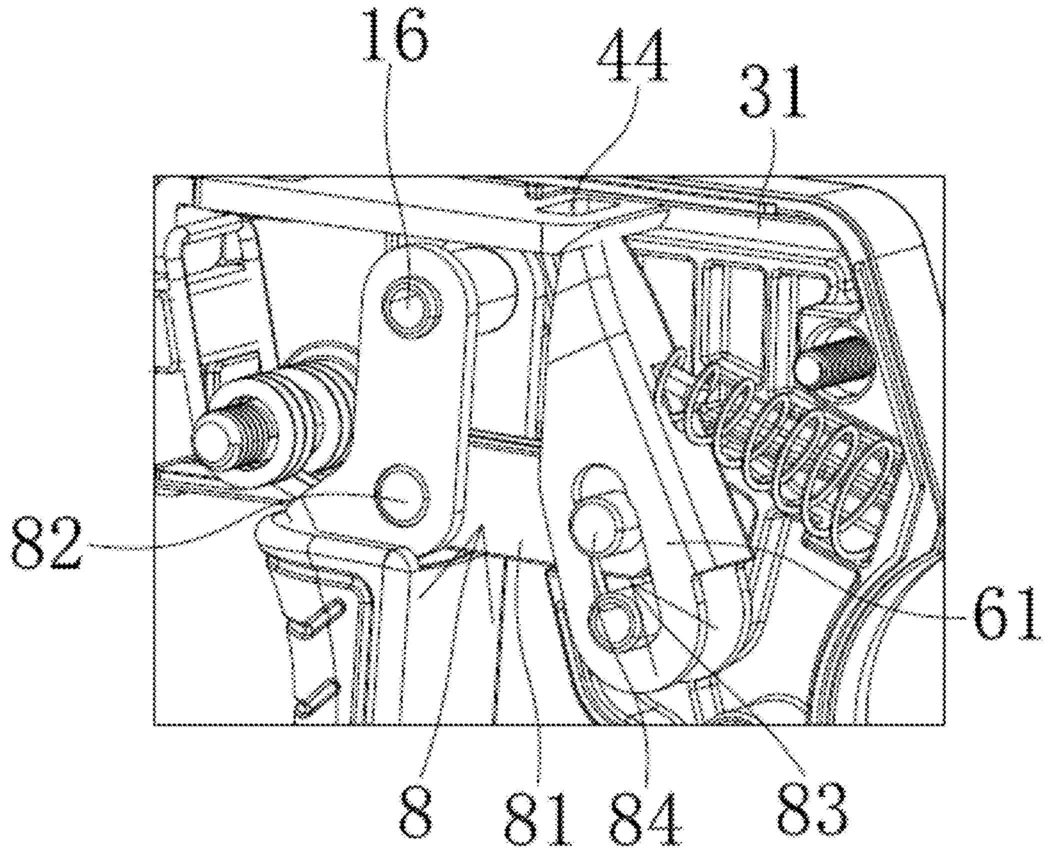
FIG. 4 is a partial enlarged view of a part A in FIG. 3 according to embodiment 1 of the present disclosure.
Figure 5:
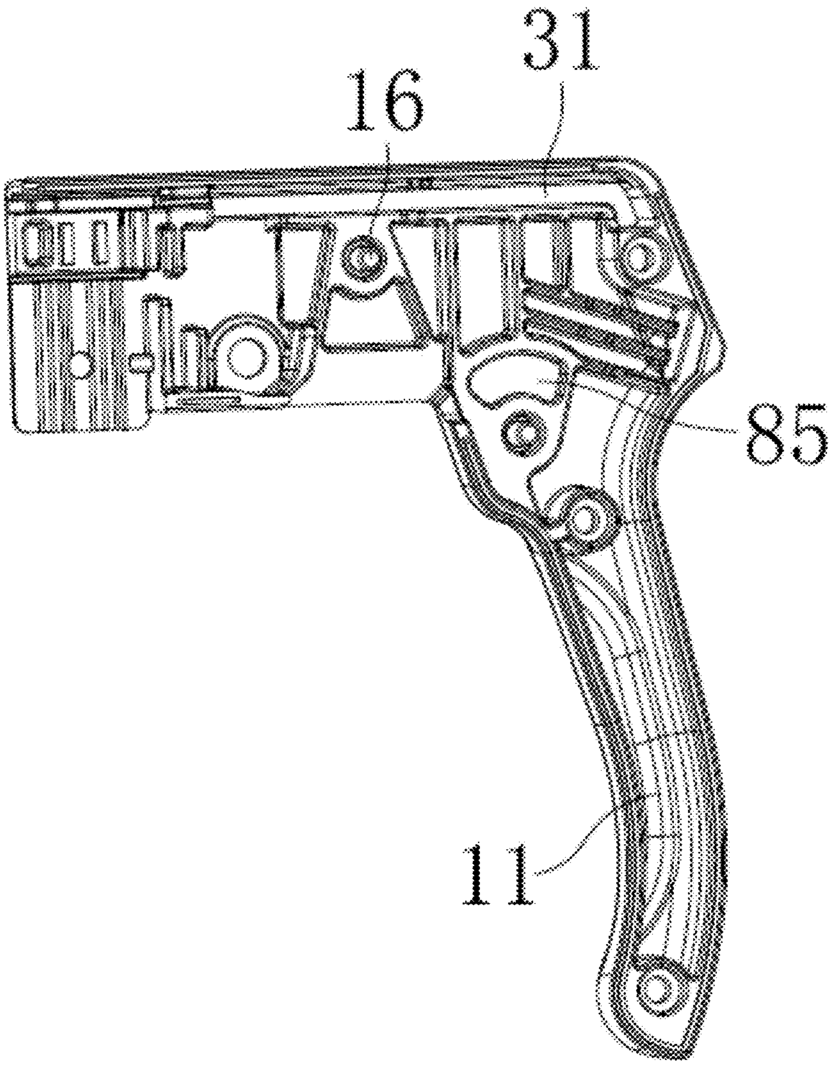
FIG. 5 is a structural schematic view of a staple gun shell in embodiment 1 according to the present disclosure.
Figure 6:
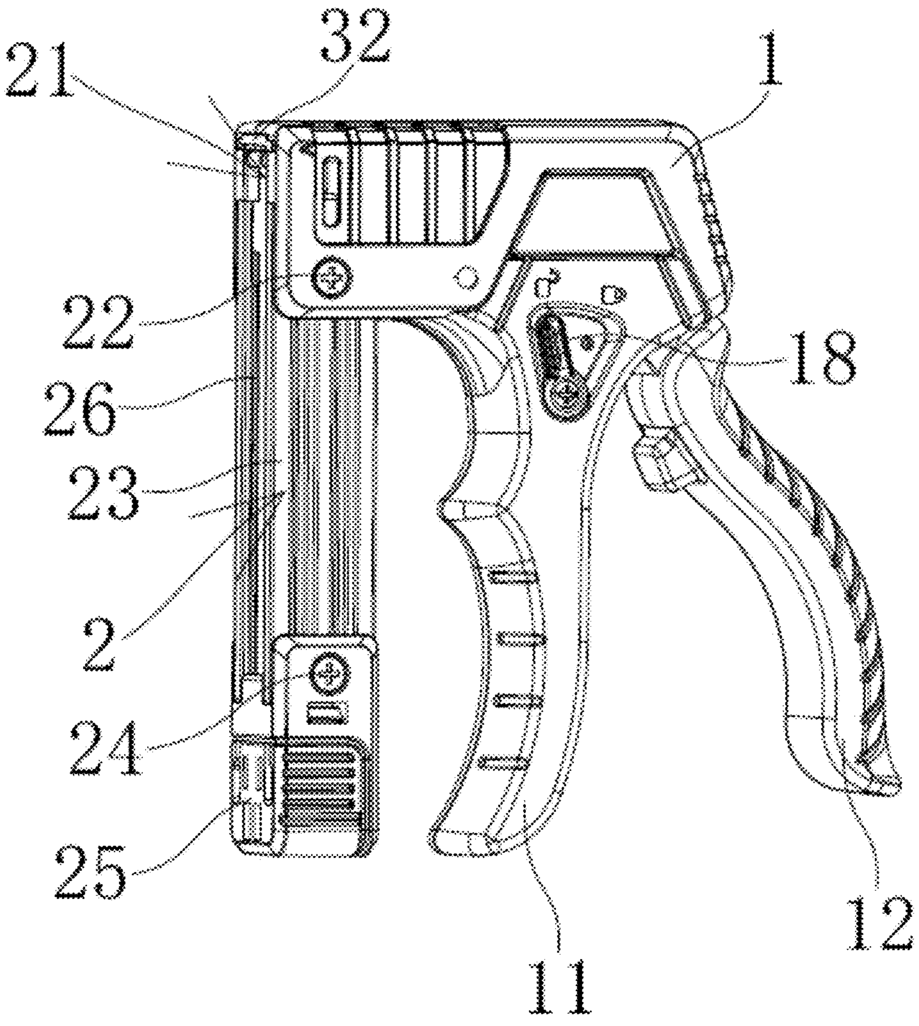
FIG. 6 is a structural schematic view of embodiment 2 according to the present disclosure.
Figure 7:
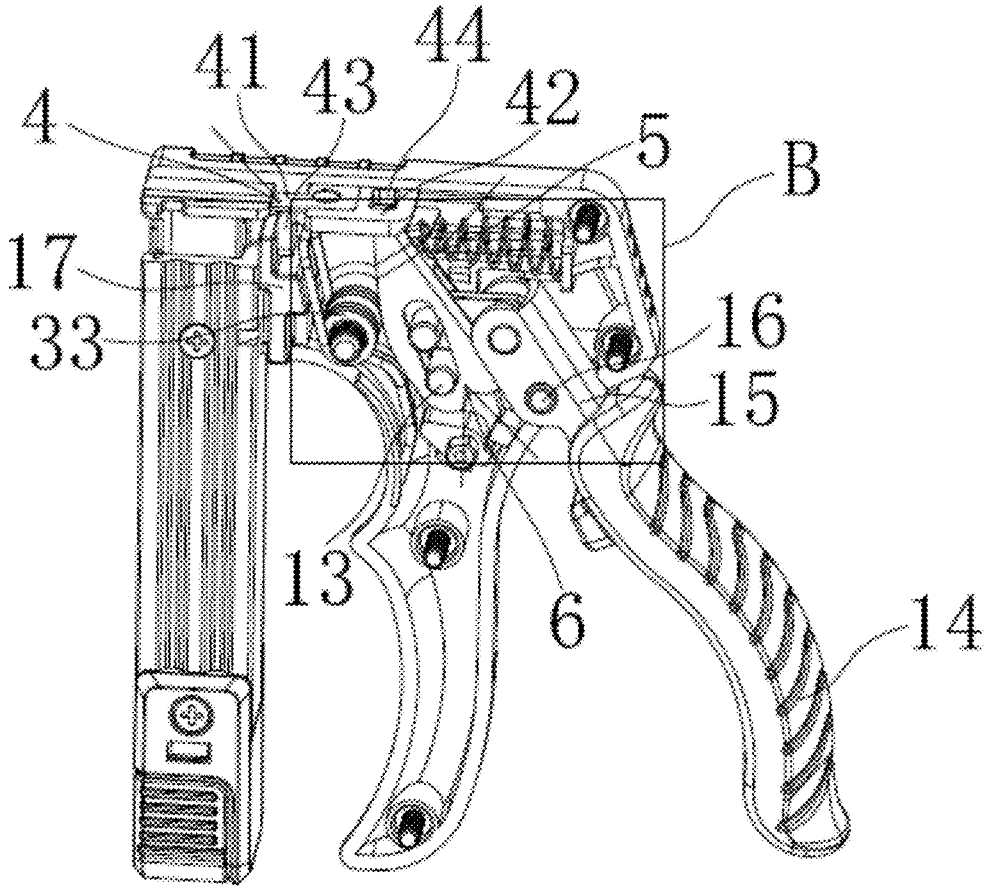
FIG. 7 is a schematic view of an internal structure of embodiment 2 according to the present disclosure.

As shown in FIG. 4 and FIG. 5, the linkage structure 8 includes a linkage plate 81 arranged between the linkage base 61 and the movable handle 12, one end of the linkage plate 81 is connected to the movable handle 12 through a first movable shaft 82, one end, far away from the sliding hole 44, of the linkage base 61 is provided with a strip-shaped hole 83 that extends in an axial direction, a fixed shaft pin 13 that is fixedly arranged in the staple gun shell 1 penetrates into one end of the strip-shaped hole 83, a second movable shaft 84 that is connected to one end, far away from the movable handle 12, of the linkage plate 81 slidably penetrates into the other end of the strip-shaped hole 83, the staple gun shell 1 is internally provided with a movable groove 85, and an end part of the second movable shaft 84 is movably arranged in the movable groove 85. The linkage plate 81 plays a role of a pry bar and moves between the linkage base 61 and the movable handle 12 through the first movable shaft 82 and the second movable shaft 84. When the movable handle 12 is under stress, the linkage plate 81 moves toward the linkage base 61, and the linkage base 61 enables an upper end of the linkage base 61 to move backward through the fixed shaft pin 13, thereby driving the sliding plate 42 to move.

As shown in FIG. 3, the pry bar reset assembly 7 includes a return spring 71 arranged in the staple gun shell 1, one end of the return spring 71 acts on an outer side of one end, far away from the strip-shaped hole 83, of the linkage base 61, and the other end of the return spring 71 acts on an inner side of the staple gun shell 1. The return spring 71 mainly plays a role in helping the linkage base 61 to return and also has the effect of pushing the sliding plate 42.

The fixed handle 11 is integrally formed on the staple gun shell 1, the movable handle 12 has a handle gripping part 14 and a handle connecting part 15, the handle connecting part 15 is hinged to the interior of the staple gun shell 1 through a hinge shaft 16, the movable handle 12 is located on one side, close to the staple outlet 21, of the fixed handle 11, the hinge shaft 16 is arranged at one end, far away from the handle gripping part 14, of the handle connecting part 15, the second movable shaft 84 is arranged between the hinge shaft 16 and the handle gripping part 14, the linkage base 61 is movably arranged on one side, far away from the staple outlet 21, of the movable handle 12 and located on an inner side of an upper end of the fixed handle 11, and the return spring 71 is obliquely arranged.

Figure 2:
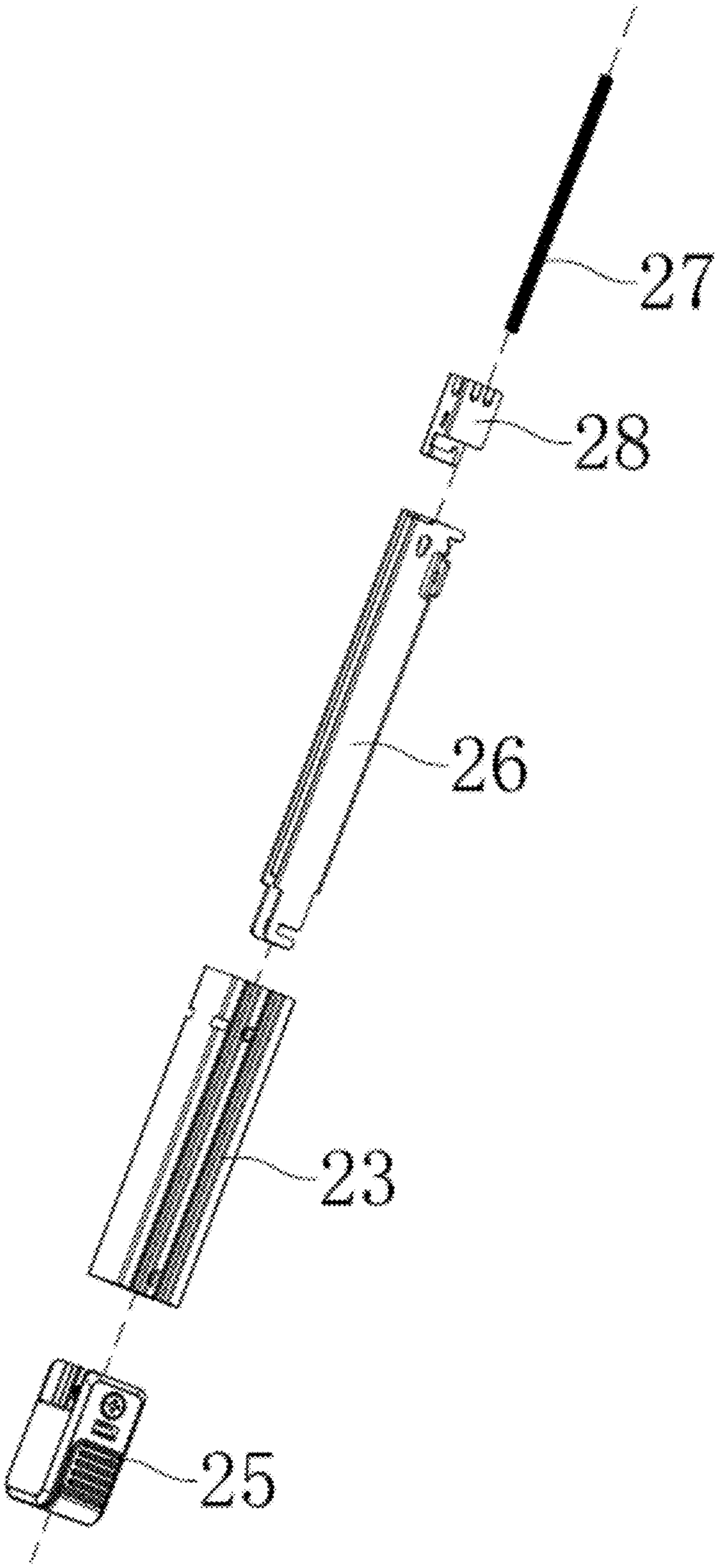
FIG. 2 is a structural explosive view of a staple storage mechanism in embodiment 1 according to the present disclosure.

As shown in FIG. 1 and FIG. 2, the staple storage mechanism 2 includes a staple storage aluminum section 23 detachably arranged on the staple gun shell 1 through a first connecting bolt 22, one end of the staple storage aluminum section corresponds to the staple outlet 21, one side of the staple storage aluminum section 23 is provided with an elastic buffer part 17 that abuts against the bending part 43, one end, far away from the staple outlet 21, of the staple storage aluminum section 23 is provided with a staple groove base 25 through a second connecting bolt 24, the staple groove base 25 is provided with a staple feeding base body 26 that penetrates into the staple storage aluminum section 23 and extends to the staple outlet 21, and a staple feeding block 28, which is connected to a tension spring 27 located in the staple feeding base body 26 and corresponds to the staple outlet 21, is slidably arranged in the staple feeding base body 26. When the staple striking torsion spring 33 returns to drive the sliding plate 42 to move forward, the bending part 43 of the sliding plate 42 abuts against the elastic buffer part 17, and the elastic buffer part 17 achieves a buffering effect, thereby prolonging the service life of the staple gun. During use, the tension spring 27 is in a U-shaped structure. When the staple feeding block 28 moves downward to enable the tension spring 27 to start stretching to feed a staple into the staple feeding base body 26, the staple feeding block 28 is released, and the tension spring 27 starts to return to feed the staple to the staple outlet 21.

Both the fixed handle 11 and the movable handle 12 are curved, an open space is formed between the fixed handle 11 and the movable handle 12, and the open space can release the gripping space to improve the applicability.

The principle of the embodiment lies in: one end of the linkage plate 81 is movably connected to the handle connecting part 15 of the movable handle 12 through the first movable shaft 82, and the other end of the linkage plate 81 is movably connected to the linkage base 61 through the second movable shaft 84; when the movable handle 12 is under stress, the movable handle 12 moves backward through the hinge shaft 16, the linkage plate 81 also moves to push the linkage base 61 to move backward, the linkage base 61 drives the staple striking plate 41 and the sliding plate 42 to move at the same time, and the staple striking torsion spring 33 under the sliding plate 42 starts to be tightened; when the force applied to the movable handle 12 disappears, the staple striking torsion spring 33 starts to return to drive the sliding plate 42 to move forward so that the staple striking plate 41 goes into the staple outlet 21 to complete staple outputting, and the movable handle 12, the linkage plate 81 and the linkage base 61 return through the return spring 71.

Embodiment 2

As shown in FIGS. 6 to 9, the principle of the embodiment and the embodiment steps are similar to those of embodiment 1. The difference is that in embodiment 1, the movable handle 12 is located on one side, close to the staple outlet 21, of the fixed handle 11, and the return spring 71 is obliquely arranged. However, in the embodiment, the movable handle 12 is located on one side, far away from the staple outlet 21, of the fixed handle 11, the hinge shaft 16 is arranged at one end, close to the handle gripping part 14, of the handle connecting part 15, the second movable shaft 84 is arranged on one side, far away from the handle gripping part 14, of the hinge shaft 16, the linkage base 61 is movably arranged on one side, close to the staple outlet 21, of the movable handle 12 and located on an inner side of an upper end of the fixed handle 11, and the return spring 71 and the sliding plate 42 extend in the same direction.

Figure 8:
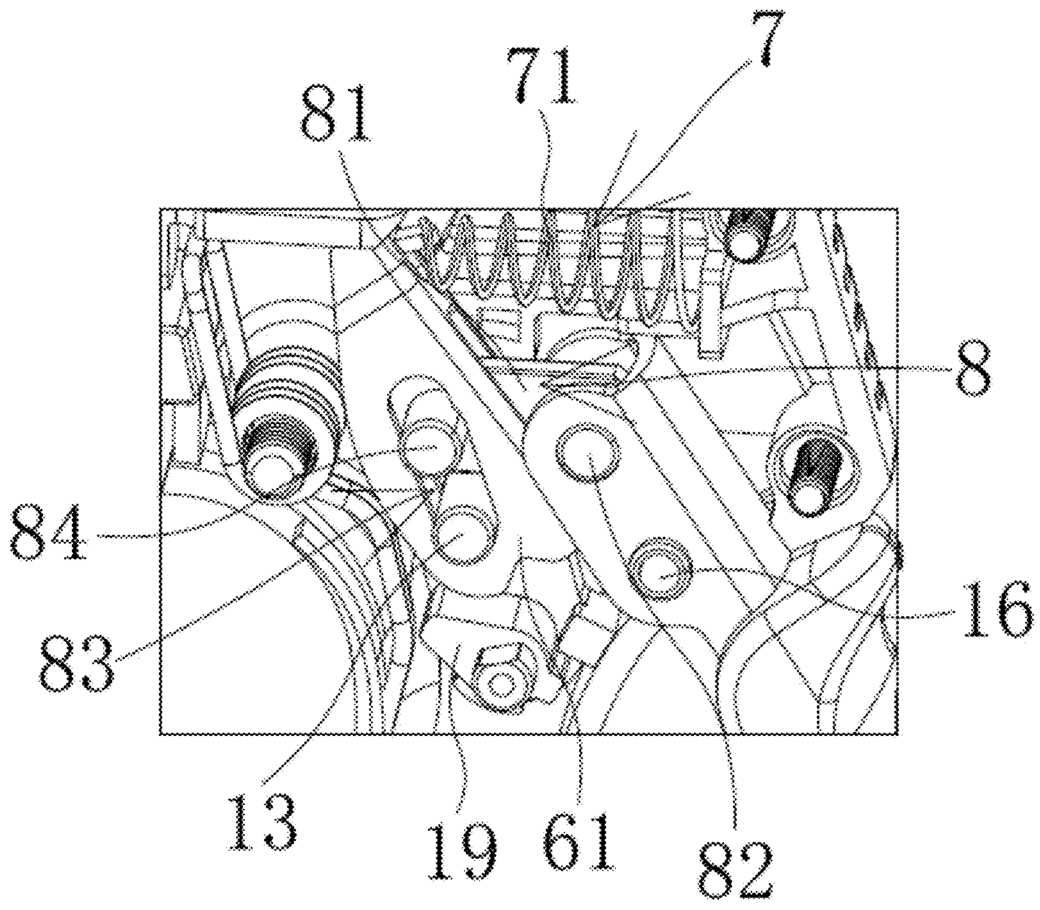
FIG. 8 is a partial enlarged view of a part B in FIG. 6 according to embodiment 2 of the present disclosure.
Figure 9:
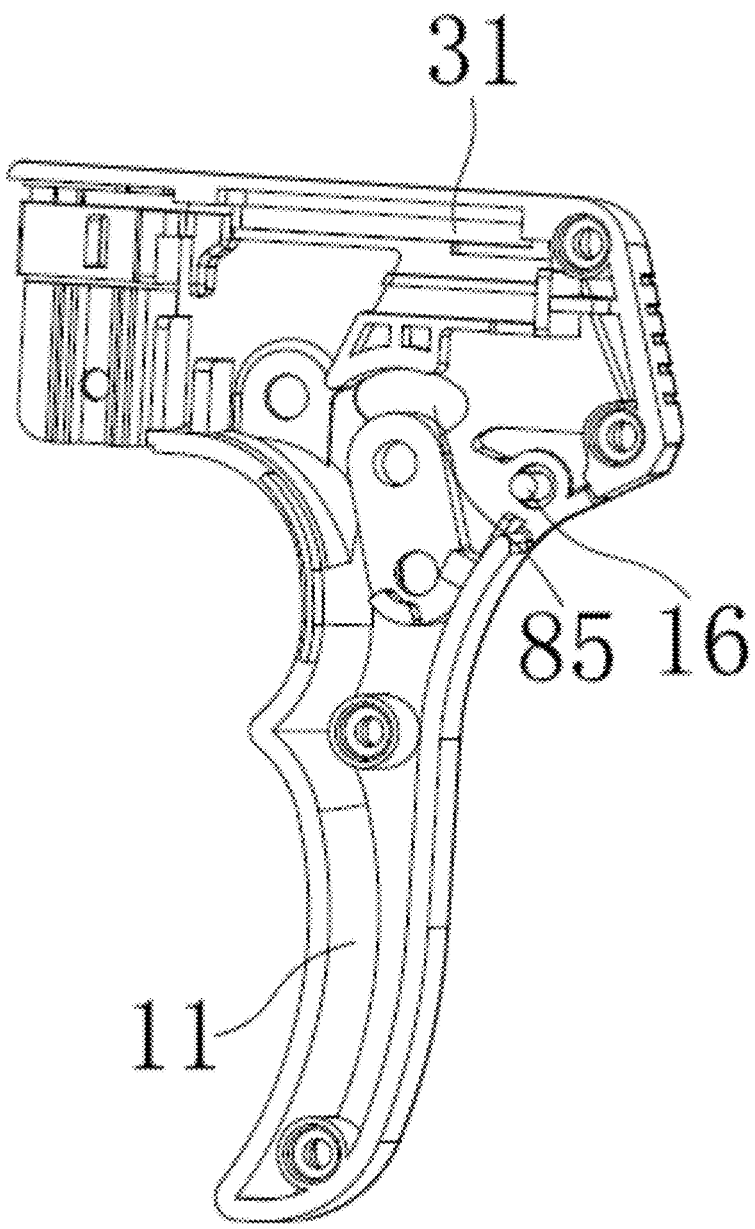
FIG. 9 is a structural schematic view of a staple gun shell in embodiment 2 according to the present disclosure.

As shown in FIG. 8, when the movable handle 12 is located on one side, far away from the staple outlet 21, of the fixed handle 11, a handle locking block 18 is rotationally arranged on the staple gun shell 1, and the handle locking block 18 is connected to a stop block 19 that is located in the staple gun shell 1 and is capable of abutting against a notch at one end, far away from the sliding hole 44, of the linkage base 61.

The specific embodiments described herein are only for example illustrations of the spirit of the present disclosure. Those skilled in the art to which the present invention pertains may make various modifications or additions to the specific embodiments described herein or replace them in a similar manner without departing from the spirit of the present disclosure or going beyond the scope defined in the appended claims.

Although relative terms are used more frequently herein, the possibility of using other terms is not excluded. These terms are only used to describe and explain the nature of the present disclosure more conveniently; it is to be construed that any additional limitation is inconsistent with the spirit of the present disclosure.

What is claimed is:

1. A staple gun, comprising:

a staple gun shell (1) with a fixed handle (11) and a movable handle (12);

wherein the staple gun shell (1) is provided with a staple storage mechanism (2), wherein one end of the staple storage mechanism (2) is provided with an opening which extends into one end of the staple gun shell (1) to form a staple outlet (21);

wherein the staple gun shell (1) is internally and slidably provided with a staple striking assembly (4) through an elastic sliding mechanism (3), and a first end of the staple striking assembly (4) is capable of penetrating into the staple outlet (21)

wherein a pry bar type linkage reset mechanism (5), arranged between the movable handle (12) and the staple striking assembly (4), is capable of driving the first end of the staple striking assembly (4) to get away from the staple outlet (21) when the movable handle (12) moves toward the fixed handle (11) under an external force, or, when the external force disappears, the pry bar type linkage reset mechanism (5) is capable of driving the movable handle (12) to move away from the fixed handle (11), and wherein the first end of the staple striking assembly (4) slides into the staple outlet (21) under an action of the elastic sliding mechanism (3);

wherein the staple striking assembly (4) comprises a staple striking plate (41) slidably arranged in the staple outlet (21), and one end, away from the staple outlet (21), of the staple striking plate (41) is connected to a sliding plate (42);

wherein the elastic sliding mechanism (3) comprises a sliding groove (31) arranged on one side inside the staple gun shell (1), the sliding plate (42) is slidably arranged in the sliding groove (31), and one end of the sliding groove (31) is provided with a staple output base (32), wherein the staple outlet (21) is formed on one side of the staple output base (32) in an axial direction, wherein a bending part (43) extending downward is arranged between the staple striking plate (41) and the sliding plate (42), a staple striking torsion spring (33) is arranged in the staple gun shell (1), one end of the staple striking torsion spring (33) acts on the bending part (43), and the other end of the staple striking torsion spring acts on the staple gun shell (1) or the movable handle (12).

2. The staple gun according to claim 1, wherein the pry bar type linkage reset mechanism (5) comprises a pry bar linkage assembly (6) and a pry bar reset assembly (7) which are arranged in the staple gun shell (1).

3. The staple gun according to claim 2, wherein the pry bar linkage assembly (6) comprises a linkage base (61) movably arranged in the staple gun shell (1), one end of the linkage base (61) is inserted into a sliding hole (44) at one end, away from the staple striking plate (41), of the sliding plate (42), and a linkage structure (8), arranged between the linkage base (61) and the movable handle (12), is capable of making the linkage base (61) move synchronously to enable the sliding plate (42) to move away from the staple striking plate (41) when the movable handle (12) moves toward the fixed handle (11) under the external force.

4. The staple gun according to claim 3, wherein the linkage structure (8) comprises a linkage plate (81) arranged between the linkage base (61) and the movable handle (12), one end of the linkage plate (81) is connected to the movable handle (12) through a first movable shaft (82), one end, away from the sliding hole (44), of the linkage base (61) is provided with a hole (83) that extends in an axial direction, a fixed shaft pin (13) that is fixedly arranged in the staple gun shell (1) penetrates into one end of the hole (83), a second movable shaft (84) that is connected to one end, away from the movable handle (12), of the linkage plate (81) slidably penetrates into the other end of the hole (83), the staple gun shell (1) is internally provided with a movable groove (85), and an end part of the second movable shaft (84) is movably arranged in the movable groove (85).

5. The staple gun according to claim 3, wherein both the fixed handle (11) and the movable handle (12) are curved, an open space is formed between the fixed handle (11) and the movable handle (12), and a handle locking block (18) is rotationally arranged on the staple gun shell (1), and the handle locking block (18) is connected to a stop block (19) that is located in the staple gun shell (1) and is capable of abutting against a notch at one end, away from the sliding hole (44), of the linkage base (61).

6. The staple gun according to claim 3, wherein the pry bar reset assembly (7) comprises a return spring (71) arranged in the staple gun shell (1), one end of the return spring (71) acts on an outer side of one end, away from the hole (83), of the linkage base (61), and the other end of the return spring (71) acts on an inner side of the staple gun shell (1).

7. The staple gun according to claim 6, wherein the fixed handle (11) is integrally formed on the staple gun shell (1), the movable handle (12) has a handle gripping part (14) and a handle connecting part (15), the handle connecting part (15) is hinged to the interior of the staple gun shell (1) through a hinge shaft (16), the movable handle (12) is located on one side, close to the staple outlet (21), of the fixed handle (11), the hinge shaft (16) is arranged at one end, away from the handle gripping part (14), of the handle connecting part (15), the second movable shaft (84) is arranged between the hinge shaft (16) and the handle gripping part (14), the linkage base (61) is movably arranged on one side, away from the staple outlet (21), of the movable handle (12) and located on an inner side of an upper end of the fixed handle (11), and the return spring (71) is obliquely arranged; or the movable handle (12) is located on one side, away from the staple outlet (21), of the fixed handle (11), the hinge shaft (16) is arranged at one end, close to the handle gripping part (14), of the handle connecting part (15), the second movable shaft (84) is arranged on one side, away from the handle gripping part (14), of the hinge shaft (16), the linkage base (61) is movably arranged on one side, close to the staple outlet (21), of the movable handle (12) and located on an inner side of an upper end of the fixed handle (11), and the return spring (71) and the sliding plate (42) extend in the same direction.

8. The staple gun according to claim 1, wherein the staple storage mechanism (2) comprises a staple storage aluminum section (23) detachably arranged on the staple gun shell (1) through a first connecting bolt (22), one end of the staple storage aluminum section corresponds to the staple outlet (21), one side of the staple storage aluminum section (23) is provided with an elastic buffer part (17) that abuts against the bending part (43), one end, away from the staple outlet (21), of the staple storage aluminum section (23) is provided with a staple groove base (25) through a second connecting bolt (24), the staple groove base (25) is provided with a staple feeding base body (26) that penetrates into the staple storage aluminum section (23) and extends to the staple outlet (21), and a staple feeding block (28), which is connected to a tension spring (27) located in the staple feeding base body (26) and corresponds to the staple outlet (21), is slidably arranged in the staple feeding base body (26).

* * * * *